United States Patent [19]

Morikawa et al.

[11] Patent Number: 5,255,084
[45] Date of Patent: Oct. 19, 1993

[54] IMAGE PROCESSING APPARATUS FOR DETERMINING RATES OF OCR FOR EVERY COLORS BY FUNCTIONS OF RESPECTIVE COLOR SIGNALS

[75] Inventors: Seiichiro Morikawa, Kanagawa; Hiroshi Shirakura, Tokyo, both of Japan

[73] Assignee: Fuji Photo Film Co., Ltd., Kanagawa, Japan

[21] Appl. No.: 755,373

[22] Filed: Sep. 5, 1991

[30] Foreign Application Priority Data

Sep. 14, 1990 [JP] Japan ................................ 2-245608

[51] Int. Cl.$^5$ .............................................. H04N 1/46
[52] U.S. Cl. ..................................... 358/527; 358/296
[58] Field of Search ........................ 358/75, 78, 79, 80, 358/76, 296, 298

[56] References Cited

U.S. PATENT DOCUMENTS

| | | | |
|---|---|---|---|
| 4,839,722 | 6/1989 | Barry et al. | 358/80 |
| 4,862,255 | 8/1989 | Takanashi et al. | 358/80 |
| 5,113,248 | 5/1992 | Hibi et al. | 358/75 |

FOREIGN PATENT DOCUMENTS

| | | |
|---|---|---|
| 0327278 | 1/1989 | European Pat. Off. . |
| 0409474 | 7/1990 | European Pat. Off. . |
| 0475362 | 3/1992 | European Pat. Off. . |
| 0249469 | 12/1985 | Japan ..................................... 358/79 |

Primary Examiner—Edward L. Coles, Sr.
Assistant Examiner—Jerome Grant, II
Attorney, Agent, or Firm—Sughrue, Mion, Zinn, Macpeak & Seas

[57] ABSTRACT

Disclosed herein is an image processing apparatus for determining the rate of UCR (under color removal) for each color by a function of each of color signals. The image processing apparatus basically comprises a device for determining the maximum value Max and the minimum value Min of each of input signals Yi, Mi and Ci, and a device for determining the rates of UCR indicative of $Y_U$, $M_U$ and $C_U$ from the input signals Yi, Mi, Ci and the maximum value Max and the minimum value Min, using respective functions $F_Y$, $F_M$ and $F_C$. The above-described $Y_U$, $M_U$ and $C_U$ can be determined in accordance with the following equations:

$$Y_U = F_Y(\text{Max, Min, Yi})$$

$$M_U = F_M(\text{Max, Min, Mi})$$

$$C_U = F_C(\text{Max, Min, Ci}).$$

4 Claims, 8 Drawing Sheets

IMAGE PROCESSING APPARATUS FOR DETERMINING RATES OF OCR FOR EVERY COLORS BY FUNCTIONS OF RESPECTIVE COLOR SIGNALS

BACKGROUND OF THE INVENTION

1. Field of the Invention:

The present invention relates to an image processing apparatus capable of obtaining a color separation plate whose image quality is superb at a shadow area in particular.

2. Description of the Related Art:

In printing and platemaking fields, there has heretofore been used a method of determining a subtraction signal used for under color removal (hereinafter be abbreviated "UCR") from the minimum value of values indicative of input signals as the three primary colors so as to use the same as a gray component, thereby performing a subtraction of the rate of UCR equivalent for each color.

One example illustrative of such a method will now be described with reference to FIGS. 1 and 2.

On a characteristic chart shown in FIG. 1, there are shown by common axes, a characteristic representing the relationship between an equivalent neutral density Dp and a black-printer value K to be reproduced on a print or printed matter, a characteristic showing the relationship between an equivalent neutral density $D_3$ created by three forms or plates of Y (yellow), M (magenta) and C (cyan) and a halftone %, and a characteristic showing the relationship between Y, M, C with respect to the black-printer value K and an equivalent neutral density $D_4$ created by the black printer. Using the characteristic chart referred to above, a point C indicative of the equivalent neutral density obtained by Y, M, C forms subjected to the under color removal and the black printer can be determined from a black-printer value B with respect to a desired density A on the print. In addition, a point Q indicative of the equivalent neutral density obtained by Y, M and C subjected to the under color removal can be determined by setting K equal to 0.

In order to carry out such a process, there is proposed a circuit shown in FIG. 2, for example. In this circuit, Yj, Mj and Cj, each indicative of the equivalent neutral density, of Y, M and C as the three primary colors are inputted to a minimum value detection circuit 42 and supplied as address data to look-up tables 46Y, 46M and 46C. The minimum value detection circuit 42 serves to determine a signal indicative of the minimum value of the equivalent neutral density, which is selected from Yj, Mj and Cj each indicative of the equivalent neutral density, i.e., the minimum value of Yj, Mj and Cj each indicative of the equivalent neutral density. The minimum value thus determined is applied to a black-printer generating circuit 44 used to generate a black-printer value. The output KS of the black-printer generating circuit 44 is supplied to each of the look-up tables 46Y, 46M and 46C as address data. Each of the look-up tables 46Y, 46M and 46C is used to store therein data about the rate of the UCR, which has previously been determined by an experiment. In addition, the look-up tables 46Y, 46M and 46C respectively output $UR_Y$, $UR_M$ and $UR_C$ each indicative of the rate of the UCR in accordance with the input KS as the address data and Yj, KS and Mj, and KS and Cj.

The above-described method has, however, the problem that noise independently produced for each color at each of the input signals exerts an influence on other color forms or plates, thereby greatly deteriorating the quality of an image of each color separation form or plate at a shadow area in particular.

SUMMARY OF THE INVENTION

It is a principal object of the present invention to provide an image processing apparatus capable of determining the rate of UCR for each color capable of providing a color separation plate whose image quality is superb, by a function of each of input color signals.

It is another object of the present invention to provide an image processing apparatus of a type wherein noise has little influence on color separations, and the rate of UCR for each color excellent in image quality of a color separation at a shadow area in particular can be determined by a function of each of input color signals.

It is a further object of the present invention to provide an image processing apparatus for determin-ing the rate of UCR for each color by a function of each of color signals, the image processing apparatus comprising means for determining the maximum value Max and the minimum value Min of each of input signals Yi, Mi and Ci, and means for determining the rates of UCR indicative of $Y_U$, $M_U$ and $C_U$ from the input signals Yi, Mi, Ci and the maximum value Max and the minimum value Min, using respective functions $F_Y$, $F_M$ and $F_C$, the $Y_U$, $M_U$ and $C_U$ being given by the following equations:

$$Y_U = F_Y(\text{Max, Min, Yi})$$

$$M_U = F_M(\text{Max, Min, Mi})$$

$$C_U = F_C(\text{Max, Min, Ci})$$

It is a still further object of the present invention to provide an image processing apparatus for determining the rate of UCR for each color by a function of each of color signals, the image processing apparatus comprising means for determining the maximum value Max and the minimum value Min of each of input signals Yi, Mi and Ci, and means for determining the rates of UCR indicative of $Y_U$, $M_U$ and $C_U$ from the input signals Yi, Mi, Ci and the maximum value Max and the minimum value Min, using a function Ft (Max, Min), the $Y_U$, $M_U$ and $C_U$ being given by the following equations:

$$t = F_t(\text{Max, Min})$$

$$Y_U = \text{Min}(1-t) + \text{Yi } t$$

$$M_U = \text{Min}(1-t) + \text{Mi } t$$

$$C_U = \text{Min}(1-t) + \text{Ci } t$$

It is a still further object of the present invention to provide the image processing apparatus wherein the function Ft is set up in such a manner that t is equal to 1 at a shadow area and t is equal to 0 at an area other than the shadow area by reference to a look-up table.

It is a still further object of the present invention to provide the image processing apparatus wherein the function Ft is defined by values set up in such a way that t is equal to 1 at a gray area, t is reduced at an area extending from the gray area to the boundary between $t=1$ and $t=0$, and $t$ is equal to 0 at the boundary therebetween.

The above and other objects, features and advantages of the present invention will become apparent from the following description and the appended claims, taken in conjunction with the accompanying drawings in which a preferred embodiment of the present invention is shown by way of illustrative example.

DETAILED DESCRIPTION OF THE PREFERRED EMBODIMENTS

Figure 3:
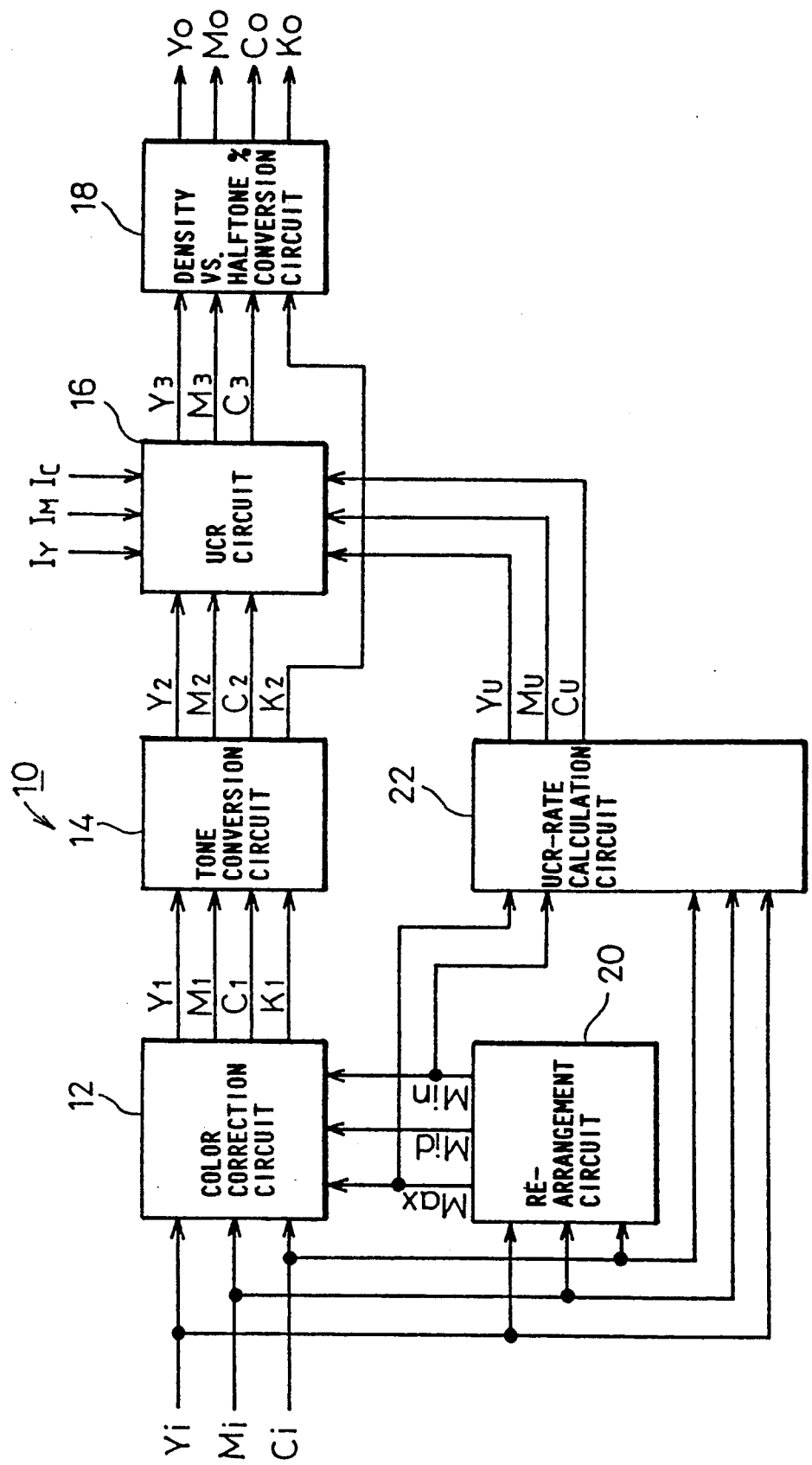
FIG. 3 is a block diagram of an image processing apparatus according to one embodiment of the present invention.

Referring to FIG. 3, designated at numeral 10 is an image processing apparatus according to one embodiment of the present invention.

Each of color signals delivered from a photoelectric converting device (not shown) using, for example, a CCD is inputted to the image processing apparatus 10 as an input signal.

In FIG. 3, symbols Yi, Mi and Ci are of color input signals indicative of yellow, magenta and cyan, respectively. The color input signals are respectively supplied to a color correction circuit 12, a rearrangement circuit 20 and a UCR-rate calculation circuit 22. The color correction circuit 12 performs color correction on the color input signals based on signals delivered from the re-arrangement circuit 20. The re-arrangement circuit 20 is used to rearrange the input signals Yi, Mi and Ci in order of their levels or magnitude. A gradation or tone conversion circuit 14 is of a circuit having a table for correcting gradation or tones.

Figure 4:
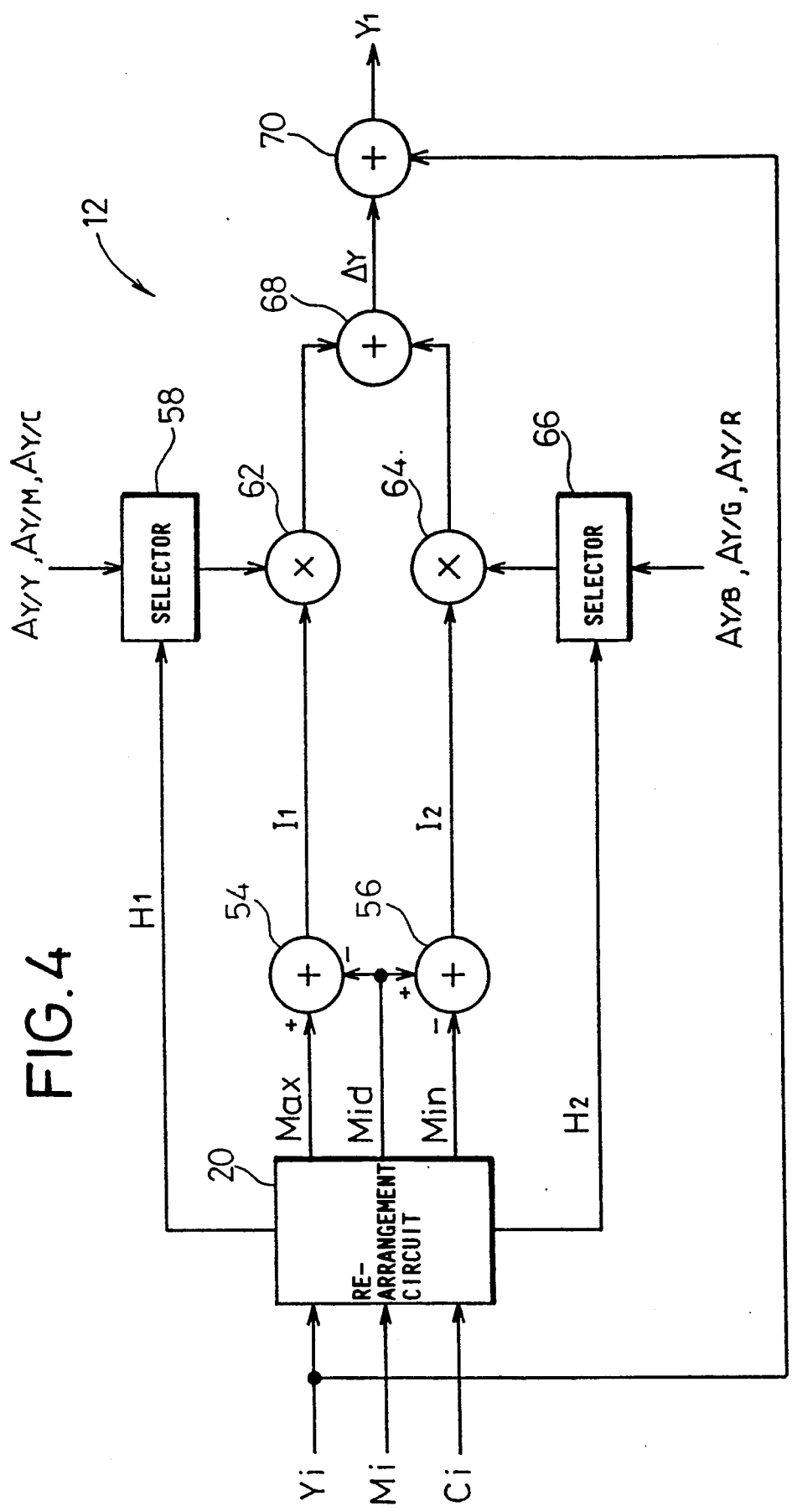
FIG. 4 is a block diagram showing a detailed structure of a color correction circuit.

A description will now be made of the color correction circuit 12 and the re-arrangement circuit 20 with reference to FIGS. 4 and 5.

The color correction circuit 12 is activated to electrically process a Y color. The input signals Yi, Mi and Ci are supplied to the re-arrangement circuit 20.

Figure 5:
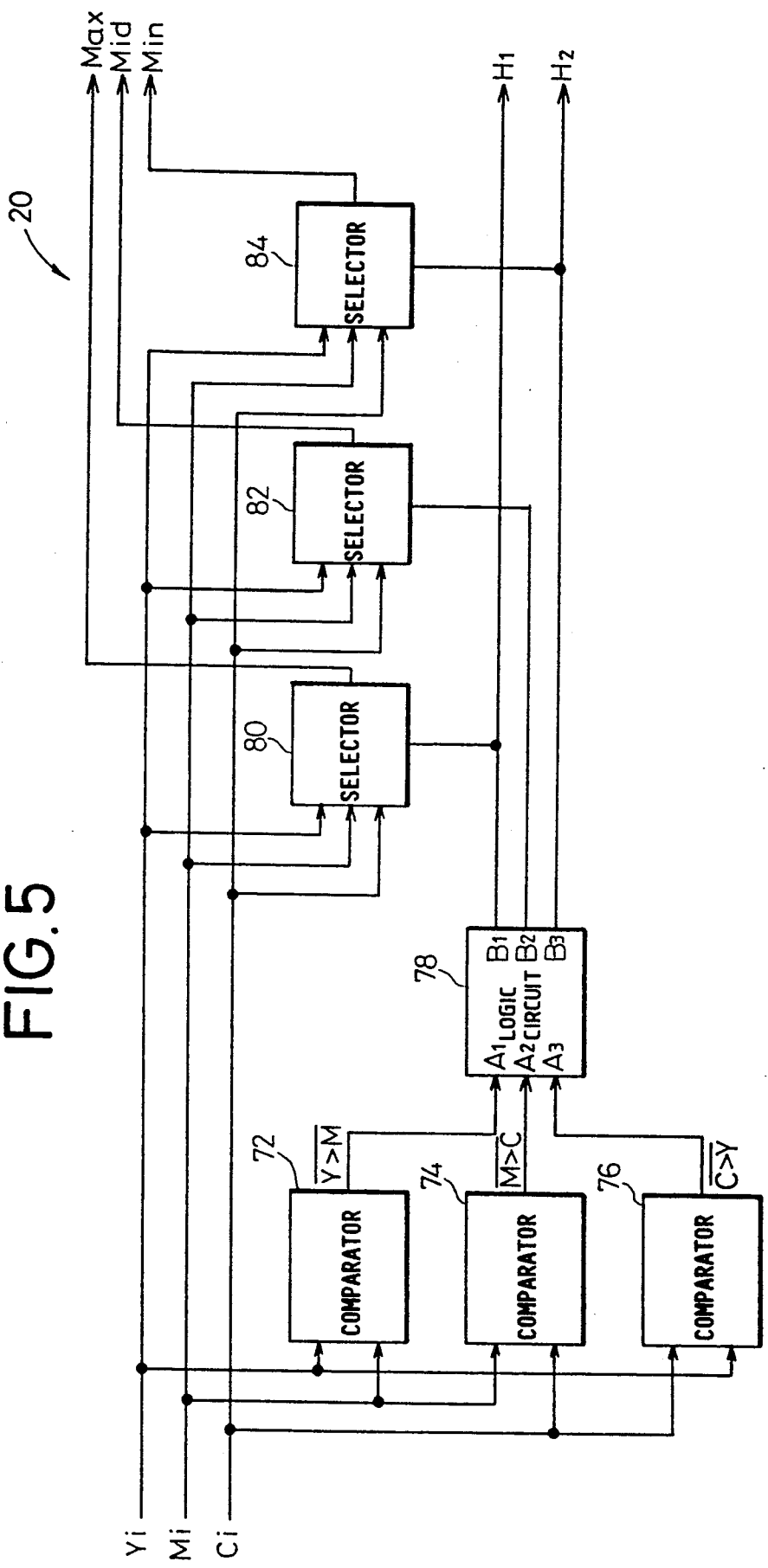
FIG. 5 is a block diagram illustrating a detailed structure of a re-arrangement circuit shown in FIG. 4.

The re-arrangement circuit 20 is constructed as shown in FIG. 5. The signals Yi, Mi and Ci, which are inputted to the re-arrangement circuit 20, are delivered to corresponding comparators 72, 74 and 76, where the levels of these input signals Yi, Mi and Ci are compared with one another. The comparator 72 compares Yi and Mi in level, and the comparator 74 compares the level of Mi with that of Ci. In addition, the comparator 76 compares the level of Ci with that of Yi. The outputs of the comparators 72, 74 and 76 are inputted to inputs $A_1$ to $A_3$, respectively, of a logic circuit 78. A logical combination is thus defined as given in Table 1 shown below.

TABLE 1

| $A_1$ | $A_2$ | $A_3$ | $B_1$ | $B_2$ | $B_3$ | Conditions |
|---|---|---|---|---|---|---|
| 0 | 0 | 0 | x | x | x | Nil |
| 0 | 0 | 1 | 0 | 1 | 2 | Yi > Mi > Ci |
| 0 | 1 | 0 | 2 | 0 | 1 | Ci > Yi > Mi |
| 0 | 1 | 1 | 0 | 2 | 1 | Yi > Ci > Mi |
| 1 | 0 | 0 | 1 | 2 | 0 | Mi > Ci > Yi |
| 1 | 0 | 1 | 1 | 0 | 2 | Mi > Yi > Ci |
| 1 | 1 | 0 | 2 | 1 | 0 | Ci > Mi > Yi |
| 1 | 1 | 1 | 0 | 1 | 2 | Yi = Mi = Ci |

Let's now consider respective color codes of $B_1$ indicative of Max color, $B_2$ indicative of a Mid color and $B_3$ indicative of a Min color. The color code indicative of "0" shows a Y color, the color code indicative of "1" represents an M color, and the color code indicative of "2" indicates a C color. More specifically, the outputs $B_1$, $B_2$ and $B_3$ of the logic circuit 78 are inputted to selectors 80, 82 and 84 respectively. The selector 80 selects, i.e., outputs one indicative of the Max color out of the input signals Yi, Mi and Ci supplied thereto. The selector 82 outputs the other indicative of the Mid color out of these signals applied thereto. In addition, the selector 84 outputs the remaining one indicative of the Min color out of these signals supplied thereto.

At the same time, the logic circuit 78 outputs a primary color factor selection signal $H_1$ as $B_1$ and a secondary color factor selection signal $H_2$ as $B_3$.

On the other hand, color space is uniformly divided into six hues of magenta (M), blue (B), cyan (C), green (G), yellow (Y), and red (R). Therefore, a subtle color can be brought out according to the distance between the respective centers of two adjacent hues. Thus, the color correction circuit 12 may perform an arithmetic operation on only factors of the two hues subjected to hue discrimination or determination. However, the two hues are the Max color and the complementary color of the Min color of the three primary colors. Therefore, the two hues can be achieved by the following Table 2 showing the relation between $H_1$, $H_2$ and factors to be selected.

TABLE 2

| $H_1$ | Factors to be selected | $H_2$ | Factors to be selected |
|---|---|---|---|
| 0 | $A_{Y/Y}$ | 0 | $A_{Y/B}$ |
| 1 | $A_{Y/M}$ | 1 | $A_{Y/G}$ |
| 2 | $A_{Y/C}$ | 2 | $A_{Y/R}$ |

Incidentally, $A_{i/j}$ is indicative of a color correction factor, and its suffix represents a correction factor of an i form or plate with respect to a hue j.

The intensity of each of the two hues, i.e., $H_1$ and $H_2$ to be color-corrected is calculated from each of the following equations represented by $I_1$ and $I_2$.

$$I_1 = (Mid\ value) - (Min\ value)$$

$$I_2 = (Mid\ value) - (min\ value)$$

Incidentally, $I_1$ represents the saturation of Y, whereas $I_2$ shows the saturation of R complementary to C.

A value to be corrected with respect to each input signal can be determined by the following equation obtained by multiplying the intensity $I_1$ by a factor $A_{Y/H1}$ and the intensity $I_2$ by a factor $A_{Y/H2}$ respectively and adding the two together.

$$\Delta Y = I_1 \cdot A_{Y/H1} = I_2 \cdot A_{Y/H2}$$

The output of the color correction circuit 12 is given by the following equation:

$$Y_1 = Y_i + \Delta Y$$

An under color removal (hereinafter be abbreviated "UCR") circuit 16 is used to remove an under color. The UCR-rate calculation circuit 22 is used to calculate the rate of UCR with respect to each color. A density vs. halftone % conversion circuit 18 is used to convert each of color signals into a signal indicative of a halftone-dot area percentage, i.e., dot percentage for printing.

A description will now be made of operations of the above-described embodiment of the present invention.

A color original image is photoelectrically scanned to produce a color separation signal, which is subjected to a fundamental masking arithmetic process. Then, digitized signals Yi, Mi and Ci are inputted to the color correction circuit 12 and simultaneously supplied to the re-arrangement circuit 20 as well. The rearrangement circuit 20 compares the levels of the input signals Yi, Mi and Ci with one another. Thereafter, the outputs of the re-arrangement circuit 20 are supplied to the color correction circuit 12. The color correction circuit 12 performs a color correction process so as to output signals $Y_1$, $M_1$ and $C_1$ subjected to the color correction and a black-printer signal $K_1$.

The signals, which have been subjected to the color correction by the color correction circuit 12, are inputted to the tone conversion circuit 14, where they are subjected to tone conversion.

The signals subjected to the tone conversion are then inputted to the UCR circuit 16. The UCR circuit 16 is supplied with output signals (each indicative of the rate of under color removal) $Y_U$, $M_U$ and $C_U$ for every colors from the UCR-rate calculation circuit 22, and with values $I_Y$, $I_M$ and $I_C$ each providing the intensity of UCR. The UCR circuit 16 performs an under color removal process for each color.

The respective signals subjected to the under color removal process by the UCR circuit 16 are supplied to the density vs. halftone % conversion circuit 18 from which $Y_O$, $M_O$, $C_O$ and $K_O$ are outputted as platemaking signals.

Figure 6:
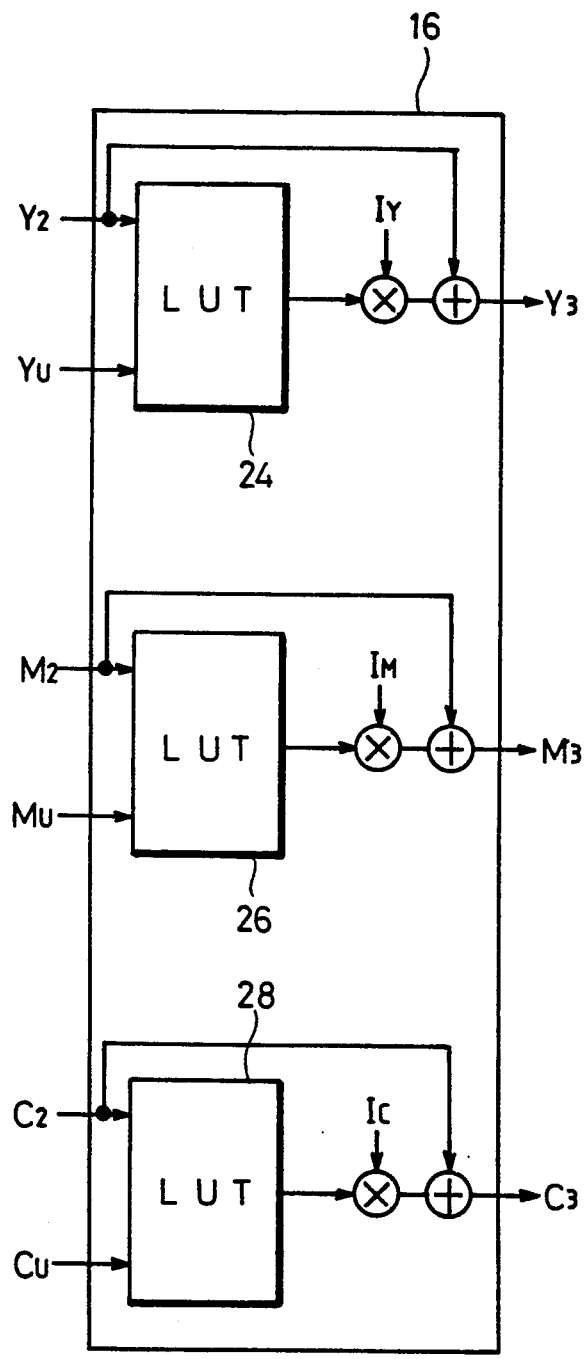
FIG. 6 is a block diagram of a UCR circuit employed in the image processing apparatus shown in FIG. 3.

The UCR circuit 16 will now be described with reference to FIG. 6.

The UCR circuit 16 comprises sub UCR circuits 24, 26, 28 which correspond to colors of Y (yellow), M(magenta), and C(cyan), respectively. The UCR circuit 24 corresponding to the Y is supplied with, for example, $Y_2$ of the outputs of the tone conversion circuit 14 and $Y_U$ of the outputs of the UCR-rate calculation circuit 22 so as to hold these $Y_2$ and $Y_U$ in a look-up table as address data. Then, the rate of the UCR, which has previously been determined by experiments, is outputted from the look-up table. Thereafter, the rate of the UCR is multiplied by the value $I_Y$ providing the UCR intensity, and the result of its multiplication is subtracted from $Y_2$, thereby making it possible to obtain $Y_3$ as the output of the UCR circuit 24.

Similarly, the UCR circuits 26 and 28 are supplied with $M_2$ from the tone conversion circuit 14 and $M_U$ from the UCR-rate calculation circuit 22, and with $C_2$ from the tone conversion circuit 14 and $C_U$ from the UCR-rate calculation circuit 22, respectively so as to hold these data $M_2$, $M_U$ and $C_2$, $C_U$ in corresponding look-up tables. Then, the rate of the UCR is outputted from each of the two look-up tables, and thereafter multiplied by each of the values $I_M$ and $I_C$ providing the UCR intensity. Then, the two results of their multiplication are subtracted from $M_2$ and $C_2$ respectively, thereby making it possible to determine $M_3$ and $C_3$. Incidentally, the respective values $I_Y$, $I_M$ and $I_C$ each indicative of the UCR intensity are of externally-set values.

Figure 1:
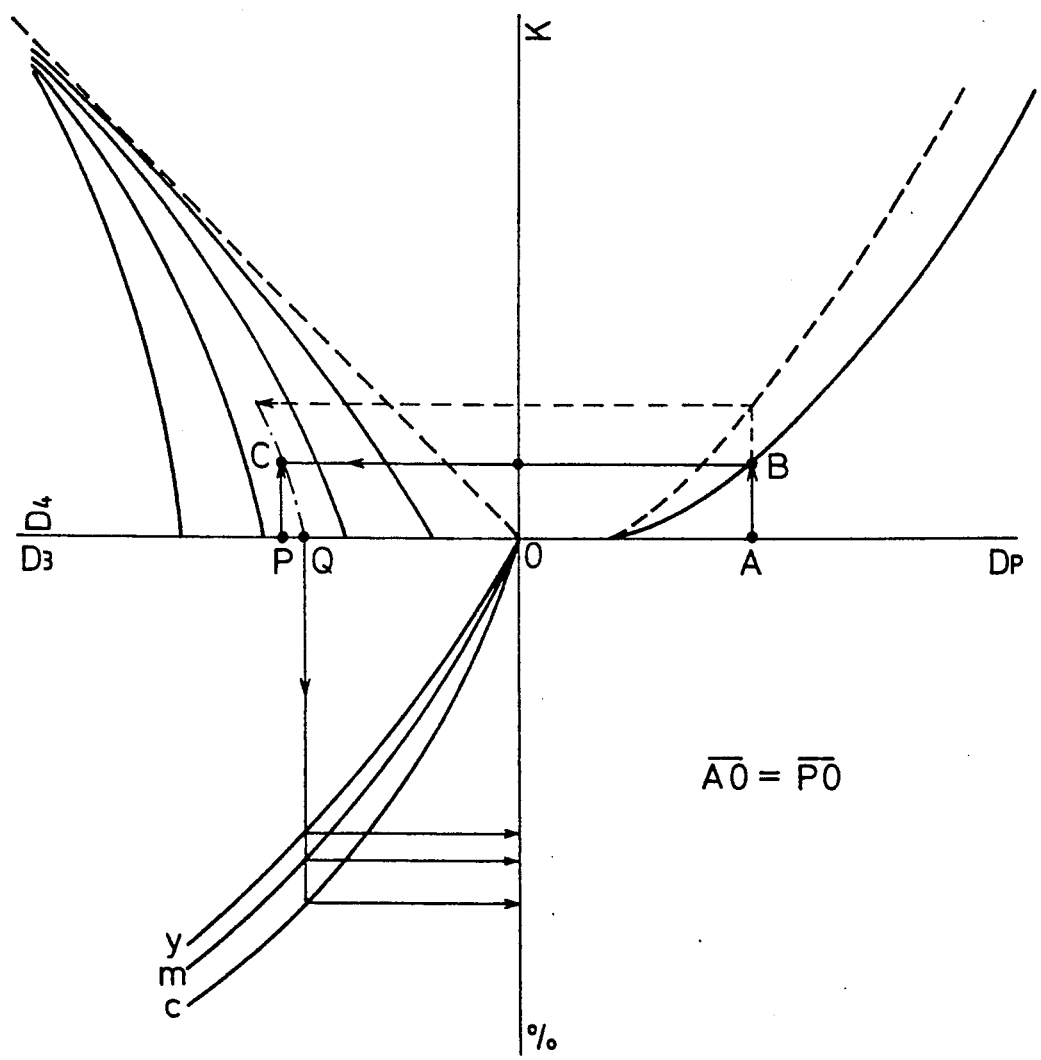
FIG. 1 is a diagram for describing the principle of under color removal.
Figure 2:
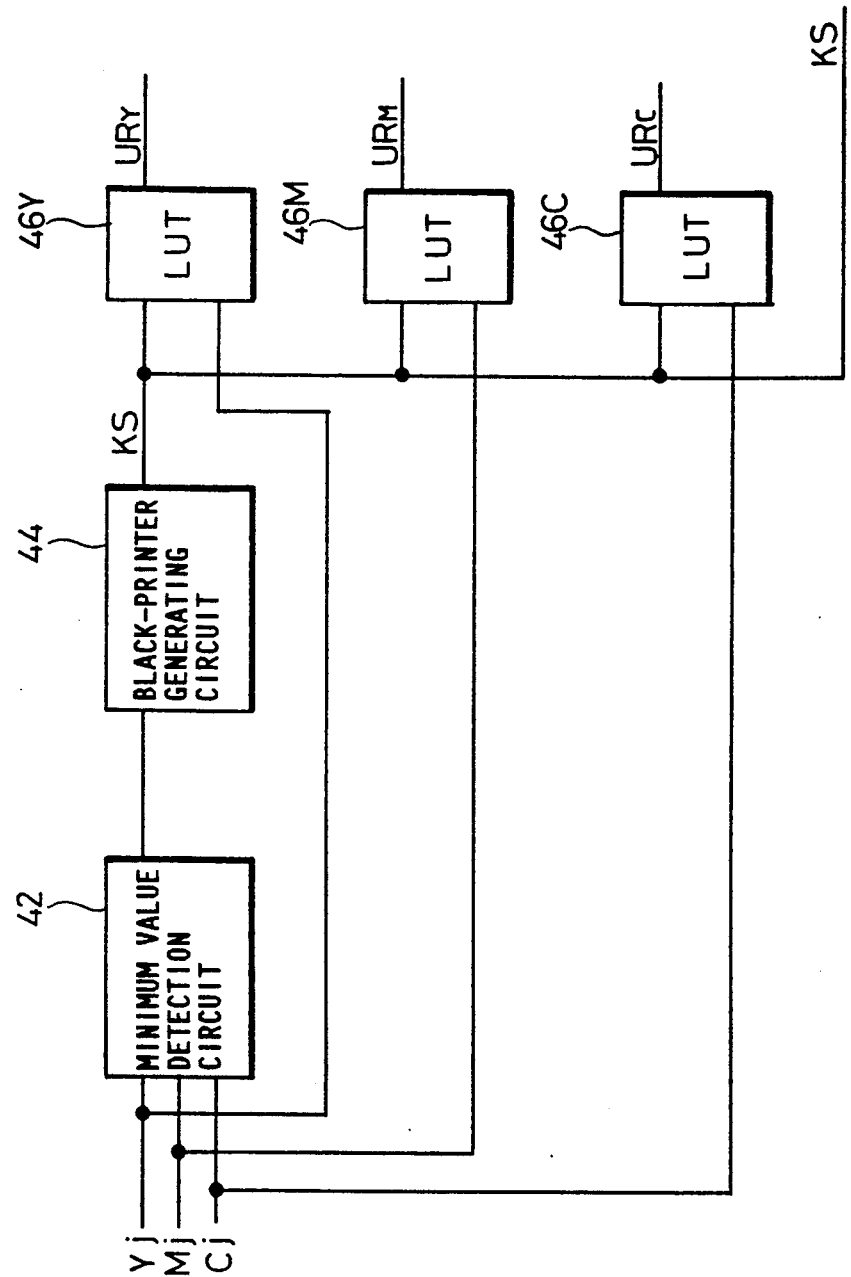
FIG. 2 is a block diagram of an under color removal circuit employed in a conventional example.

As shown in FIG. 3, the outputs $Y_U$, $M_U$ and $C_U$ each indicative of the rate of the under color removal, which are inputted to the UCR circuit 16, are determined by the maximum and minimum values Max and Min of each of the input signals Yi, Mi, Ci and respective functions $F_Y$, $F_M$ and $F_C$ of the input signals Yi, Mi and Ci. Incidentally, each of the functions $F_Y$, $F_M$ and $F_C$ is set up as a look-up table. Each of the outputs $Y_U$, $M_U$ and $C_U$ indicative of the rate of the UCR is equivalent to an output KS shown in FIG. 2. In FIG. 2, the under color removal process is carried out based on Yi, Mi, Ci each indicative of an equivalent neutral density and the output KS. In the present embodiment, a signal corresponding to the output KS as a black-printer value is determined from the input signals Yi, Mi, Ci and their maximum and minimum values.

The outputs of the UCR-rate calculation circuit 22 are given by the following equations:

$$Y_U = F_Y(Max, Min, Yi)$$

$$M_U = F_M(Max, Min, Mi)$$

$$C_U = F_C(Max, Min, Ci).$$

Figure 7:
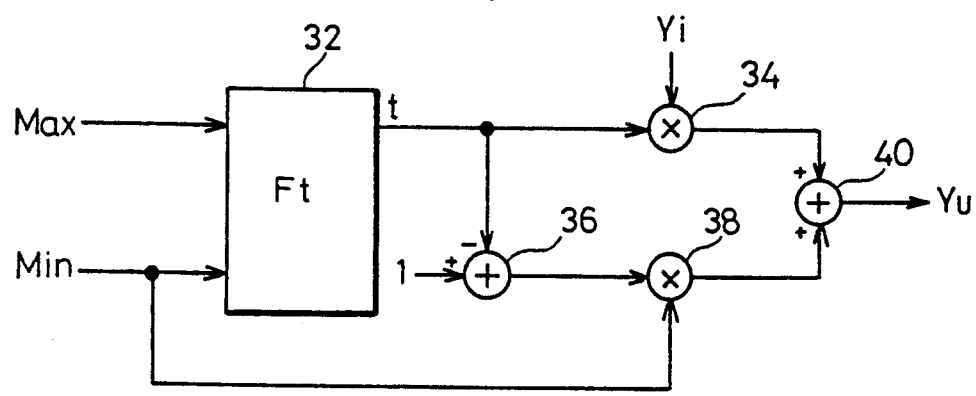
FIG. 7 is a block diagram showing one example of the structure of a UCR-rate calculation circuit.

A circuit for calculating $Y_U$ of these outputs will specifically be shown in FIG. 7. This circuit comprises a look-up table 32, additive circuits 36, 40, and multiplication circuits 34, 38. The look-up table 32 is supplied as inputs thereof with the maximum value Max and the minimum value Min from the re-arrangement circuit 20 shown in FIG. 3. Then, the output of the look up table 32 is multiplied by an input signal Yi in the multiplication circuit 34, and subtracted from a signal 1 in the additive circuit 36. In addition, the output of the additive circuit 36 is multiplied by the minimum value Min in the multiplication circuit 38. Finally, the outputs of the multiplication circuits 34 and 38 are added together in the additive circuit 40 so as to generate $Y_U$ therefrom. The remaining outputs $M_U$ and $C_U$ can be processed in the same manner as described above. Thus, the respective outputs $Y_U$, $M_U$ and $C_U$ can be determined by the following equations:

$$t = Ft(Max, Min)$$

$$Y_U = Min(1-t) + Yi\, t$$

$$M_U = Min(1-t) + Mi\, t$$

$$C_U = Min(1-t) + Ci\, t.$$

Figure 8:
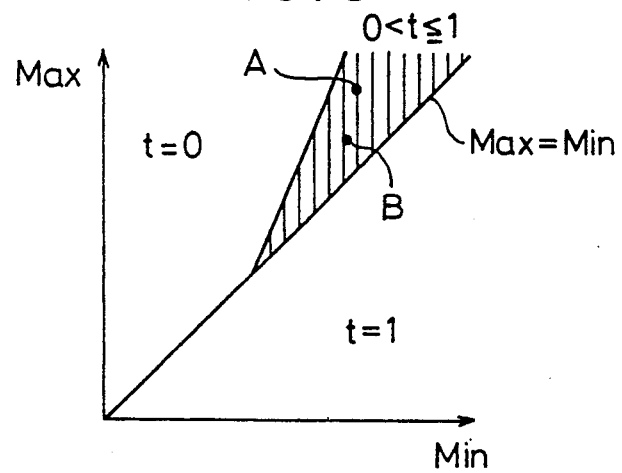
FIG. 8 is a diagram descriptive of a shadow area on the plane, which is defined between the maximum value and the minimum value.

When $t=0$, the normal rate of UCR is calculated. When $0 < t < 1$, the normal rate of UCR and the rate of UCR for each color, which have been weighted, are calculated. When $t=1$, the rate of UCR for each color is calculated. There is defined a table for each color at each of points A and B in a region (an area defined by the oblique line shown in FIG. 8, i.e., a shadow area) established by a combination of Max and Min, for example. If Min is either equal to or greater than Max (Min ≧ Max), then t is set equal to 1 (t=1). If other than Min ≧ Max, then t is set to 0 (t=0). In doing so, the rate of the UCR can independently be determined for each color at the shadow area. As a result, noise produced at the shadow area of a reproduced image can be minimized. In addition, a normal image can be reproduced at an area other than the shadow area.

Figure 9:
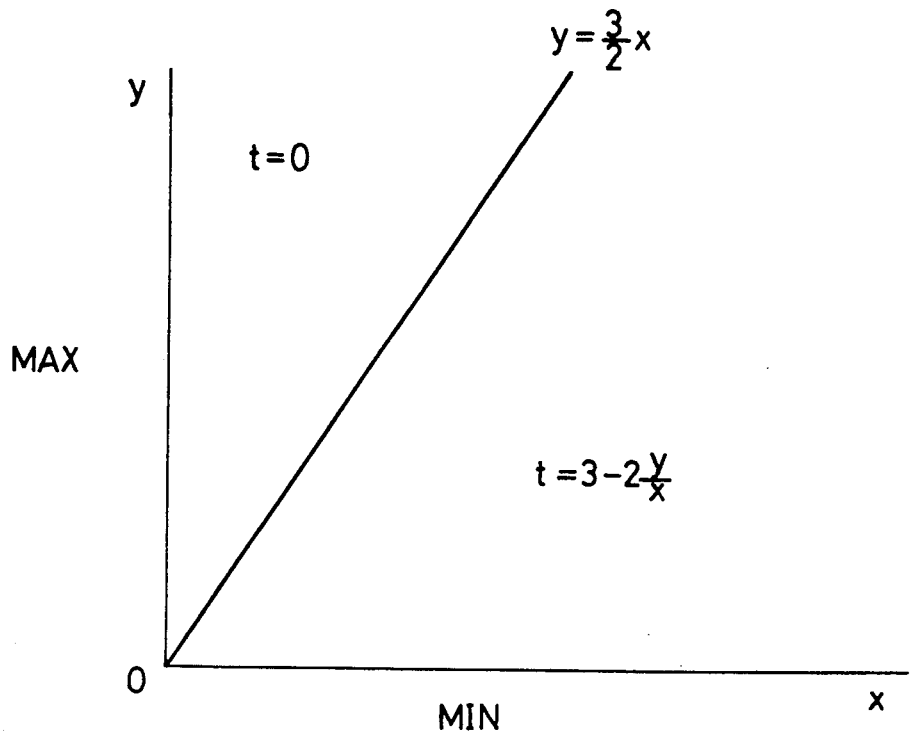
FIGS. 9 and 10 are diagrams each descriptive of a specific example of a function Ft.
Figure 10:
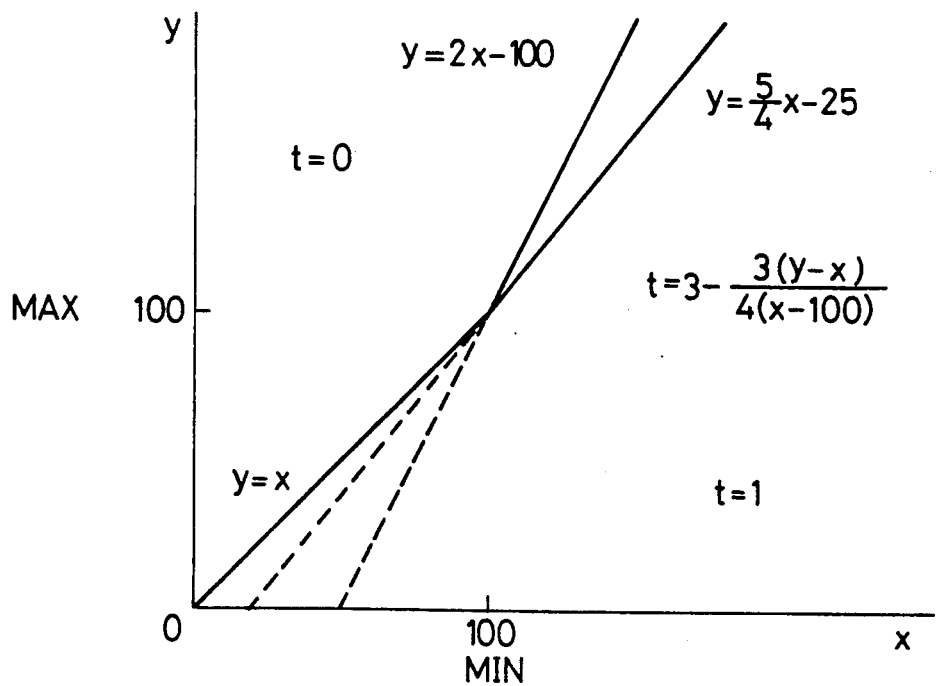

Described more specifically, let's now assume that $y=3/2 \cdot x$ giving a straight line is considered to be a boundary line as shown in FIG. 9. If $y > 3/2 \cdot x$, then t is set to 0 (i.e., t=0). If $y \leq 3/2 \cdot x$, then t is set to $3-2 \cdot y/x$ (t=$3-2 \cdot y/x$). Thus, a suitable image can be reproduced. As shown in FIG. 10, when $y > x$ and $y > 2x-100$, t is set to 0 (t=0). When $y \leq 2x-100$ and $y > 5/4 \, x-25$, t is set to $3-3(y-x)/4(x-100)$ [t=$3-3(y-x)/4(x-100)$]. Further, when $y \leq x$ or $y \leq 5/4 \, x-25$, t is set to 1 (t=1). In this way, the optimum image can be reproduced.

According to the image processing apparatus of the present invention, the rate of UCR for each color is determined from the maximum and minimum values of the three primary colors and the respective color signals without using only a signal determined from the minimum value of values of input signals indicative of the three primary colors. Therefore, noise independently produced for each color at each of the input signals can be prevented from appearing at other color separation forms or plates. As a consequence, the quality of an image of each color separation plate can be improved at the shadow area in particular.

Having now fully described the invention, it will be apparent to those skilled in the art that many changes and modifications can be made without departing from the spirit or scope of the invention as set forth herein.

What is claimed is:

1. An image processing apparatus for determining the rate of UCR (under color removal) for each color by a function of each of color signals, said image processing apparatus comprising:

means for determining the maximum value Max and the minimum value Min of each of input signals Yi, Mi and Ci; and means for determining the rates of UCR indicative of $Y_U$, $M_U$ and $C_U$ from the input signals Yi, Mi, Ci and the maximum value Max and the minimum value Min, using respective functions $F_Y$, $F_M$ and $F_C$, said $Y_U$, $M_U$ and $C_U$ being given by the following equations:

$$Y_U = F_Y(Max, Min, Yi)$$

$$M_U = F_M(Max, Min, Mi)$$

$$C_U = F_C(Max, Min, Ci).$$

2. An image processing apparatus for determining the rate of UCR (under color removal) for each color by a function of each of color signals, said image processing apparatus comprising:

means for determining the maximum value Max and the minimum value Min of each of input signals Yi, Mi and Ci; and means for determining the rates of UCR indicative of $Y_U$, $M_U$ and $C_U$ from the input signals Yi, Mi, Ci, and the maximum value Max and the minimum value Min, using a function Ft (Max, Min), said $Y_U$, $M_U$ and $C_U$ being given by the following equations:

$$t = Ft(Max, Min)$$

$$Y_U = Min \cdot (1-t) + Yi \cdot t$$

$$M_U = Min \cdot (1-t) + Mi \cdot t$$

$$C_U = Min \cdot (1-t) + Ci \cdot t.$$

3. An image processing apparatus according to claim 2, wherein said function Ft is set up in such a manner that t is equal to 1 at a shadow area and t is equal to 0 at an area other than the shadow area by reference to a look-up table.

4. An image processing apparatus according to claim 2, wherein said function Ft is defined by values set up in such a way that t is equal to 1 at a gray area, t is reduced at an area extending from the gray area to the boundary between t=1 and t=0, and t is equal to 0 at the boundary therebetween.

* * * * *

UNITED STATES PATENT AND TRADEMARK OFFICE
CERTIFICATE OF CORRECTION

PATENT NO. : 5,255,084
DATED : Oct. 19, 1993
INVENTOR(S) : Seiichiro MORIKAWA et al.

It is certified that error appears in the above-indentified patent and that said Letters Patent is hereby corrected as shown below:

On the title page, item [54] and column 1, line 3, change "OCR" to --UCR--.

Signed and Sealed this

Twenty-first Day of June, 1994

Attest:

BRUCE LEHMAN

*Attesting Officer*     *Commissioner of Patents and Trademarks*